United States Patent [19]

Wilkinson et al.

[11] 4,420,788

[45] Dec. 13, 1983

[54] PHASE RELAY FOR AC POWER TRANSMISSION LINE PROTECTION

[75] Inventors: Stanley B. Wilkinson, Havertown; George E. Alexander, Wallingford, both of Pa.

[73] Assignee: General Electric Company, King of Prussia, Pa.

[21] Appl. No.: 403,273

[22] Filed: Jul. 29, 1982

[51] Int. Cl.³ .......................... H02H 3/26; H02H 7/26
[52] U.S. Cl. ........................................ 361/85; 361/80; 361/67
[58] Field of Search ...................... 361/85, 80, 81, 67, 361/62, 65, 82; 324/51, 52

[56] References Cited

U.S. PATENT DOCUMENTS

| 3,374,399 | 3/1968 | Dewey | 361/80 |
| 3,992,651 | 11/1976 | Hodges | 361/76 |
| 4,034,269 | 7/1977 | Wilkinson | 361/79 |
| 4,148,087 | 4/1979 | Phadke | 361/81 X |
| 4,161,011 | 7/1979 | Wilkinson | 361/80 |
| 4,222,085 | 9/1980 | Mesmaeker | 361/85 X |
| 4,296,451 | 10/1981 | Wilkinson | 361/80 |
| 4,342,062 | 7/1982 | Hodges | 361/76 |

OTHER PUBLICATIONS

Paper by S. B. Wilkinson and C. A. Mathews, "Dynamic Characteristics of MHO Distance Relays", presented to Pennsylvania Electric Assn. Relay Committee, Winter Meeting, Philadelphia, Pa., Feb. 22, 1979.

Primary Examiner—Patrick R. Salce
Attorney, Agent, or Firm—William Freedman

[57] ABSTRACT

A phase relay utilizes improved polarizing and operating signals in order to provide discrimination between internal faults within a protected zone of an AC power transmission line and external faults than can appear as internal faults due to transients induced by capacitive voltage transformers or series capacitors. A zero sequence restraint signal is used to block operation of the phase relay on close-in single line to ground faults. A filter is used in a by-pass circuit to attenuate high frequency transients which might delay, and possibly prevent a trip output on an internal fault. A high set by-pass circuit, including zero suppression to preclude an output on an external fault, is employed to provide faster operating times on severe internal faults. Forward offset and/or zero suppression of the polarizing signal is used to reduce the characteristic timer setting and therefore increase the speed of the phase relay operation.

20 Claims, 6 Drawing Figures

PHASE RELAY FOR AC POWER TRANSMISSION LINE PROTECTION

BACKGROUND OF THE INVENTION

The present invention relates to protective relay circuits for use in AC power distribution systems and more particularly to phase relays for transmission line protection.

Distance relays are well known in the art of protective relaying. For example, reference may be had to "The Art and Science of Protective Relaying", Mason, published by John Wiley and Son, Inc. (1956), particularly to Chapter 14. Prior art distance relays include those which employ a phase comparator method of measurement. Exemplary circuits for phase comparator distance relays are disclosed in U.S. Pat. No. 4,034,269, issued to S. B. Wilkinson, one of the co-inventors of the present invention, on July 5, 1977. This patent is assigned to the assignee of the present invention and is incorporated by reference into the present application as if fully set forth herein.

Phase distance relays are utilized in protective systems for AC power transmission lines to detect phase to phase faults within a protected zone or portion of the transmission line. Phase distance relays are utilized to detect faults involving more than one electrical phase and if such a fault is detected within the relay's zone or reach, the phase relay will cause the operation of a three pole circuit breaker to trip all three phases of the transmission line. This is to be contrasted with a ground relay which detects faults between a phase and ground, again within a designated zone or reach; and, upon detection of such a fault, generates a signal which may operate a circuit breaker to trip the faulted phase only.

As indicated above, each particular phase relay should only detect faults within its protected zone or reach. The parameters of a phase relay are commonly selected to correspond to the parameters of the transmission line. For example, the parameters are selected to provide a forward reach that may correspond to the forward distance of the zone of the transmission line under the protection of the particular relay. It is desired that the phase relay operate within its selected forward reach thereby confining the protection of a particular phase relay to a selected zone within a protected system. A reverse offset may also be used if required.

The desired operation of a phase relay may be hindered by the inability to distinguish between internal and external faults. Internal faults are those faults which occur within the protected zone or reach of the relay, whereas external faults are those that occur outside of the zone or relay reach. For example, transients generated by capacitive voltage transformers or series capacitors at the occurrence of an external fault, which are coupled to the transmission line, often appear as internal faults to a phase relay. Another problem affecting the operation of phase relays is the generation of high frequency transients by travelling waves at the incidence of a fault, or transients occurring when the protective gaps of series capacitors flash over. These high frequency transients may cause undersireable delays in operation for faults within the protected zone of the relay. Also, these high frequency tansients might cause the erroneous generation of a trip signal by a phase relay which improperly recognizes the transient as a transmission line fault within the protected zone of the relay.

An additional problem which can adversely affect the operation of phase relays is the generation of a three phase tripping signal upon detection of a close-in single phase to ground fault. Upon the occurrence of such a single phase to ground fault, it is often desirable only to trip the faulted phase leaving the two remaining unfaulted phases in service. Due to the potential catastrophic consequences of severe internal faults in a high voltage AC power transmission system, it is desirous that a phase relay provide a tripping signal as quickly as possible upon detection of such a severe fault. In most prior art phase relays, the detection of such severe close-in faults is treated in the same manner as the detection of other less severe faults within the zone of protection and consequently the relay operated at the same speed in both situations.

Accordingly, it is an object of the present invention to provide improved discrimination between internal and external faults thereby increasing the reliability of relay operation and the security of the protection system.

Another object of the present invention is to minimize erroneous operation of the phase relay due to the presence of high frequency transients on the protected line.

A further object of the present invention is to prevent operation of the phase relay upon detection a close-in single phase to ground fault.

Yet another object of the present invention is to provide faster operating times upon detection of severe internal faults.

A further object of the present invention is to provide an improved polarizing signal using positive sequence current to derive a forward offset reach in order to reduce relay characteristic timer settings and obtain an improved steady state characteristic when the relay is used on a heavily loaded line and thereby increase relay operating speed.

These and other objects of the present invention will become apparent to those skilled in the art upon consideration of the following description of the invention.

SUMMARY OF THE INVENTION

The present invention comprises a protective phase relay circuit for generating a signal for controlling the trip coil of a circuit breaker protecting an alternating current power transmission line. In one aspect of the invention, the protective sequence component of a selected phase to phase current is used to provide a forward offset which diminishes upon occurrence of a phase to phase fault thereby increasing the relay operate characteristic from the steady state prefault condition, or a three phase fault.

Another aspect of the present invention is the generation and use of a severe fault signal which enhances the operating time of the relay upon detection of a severe close-in fault. A further aspect of the present invention is the generation and use of a zero sequence restraint signal which prevents the phase relay of the present invention from tripping upon detection of a single phase to ground fault.

An additional aspect of the present invention is the provision of filters having different Q's which interact in order to provide better discrimination between internal faults and external faults which can appear as internal faults due to capacitor voltage transformers or series capacitor transients.

A further aspect of the present invention is the provision of a by-pass circuit having a filter for attenuating high frequency transients which would delay and possibility prevent a relay trip output on an internal fault.

DETAILED DESCRIPTION OF THE DRAWINGS

While the specification concludes with claims particularly pointing and distinctly claiming that which is regarded as the present invention, the object and advantages of this invention can be more readily ascertained from the following description of a preferred embodiment when read in conjunction with the accompanying drawings in which:

DETAILED DESCRIPTION OF THE PREFERRED EMBODIMENT

For the sake of convenience, certain elements described with reference to a specific figure will retain the same reference designation in the description of subsequent figures.

Figure 1:
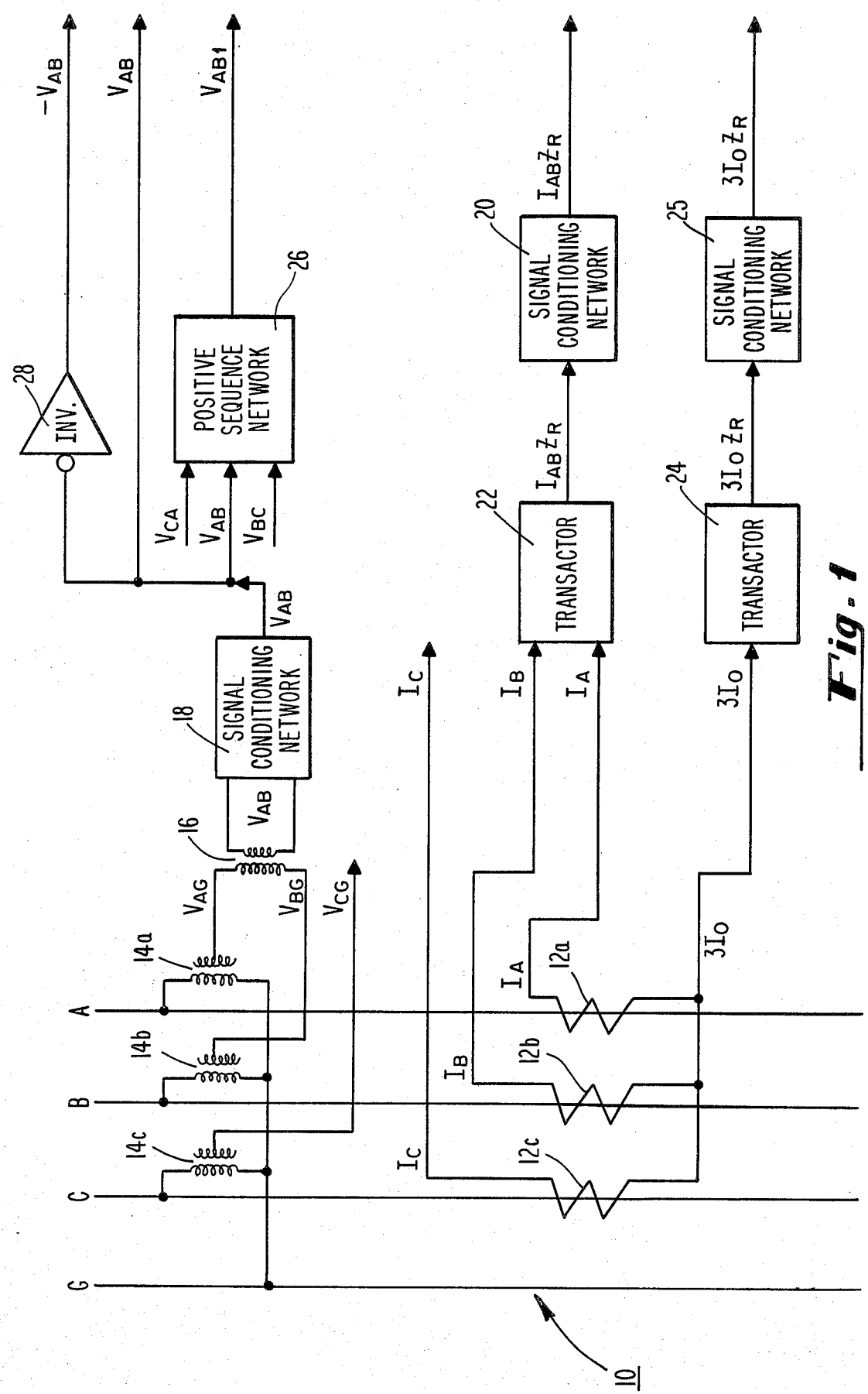
FIG. 1 is a schematic block diagram depicting development of desired source signals from a transmission line for use by a phase relay of the present invention.

Referring to FIG. 1 there is shown a three phase alternating current electric power transmission line, generally designaed 10, having an A phase, a B phade, a C phase and ground (G). Each of the three phases has associated with it a means 12 for sensing the current in that particular phase as well as a means 14 for sensing voltage on that phase. As is well known to those skilled in the protective relaying and power transmission art, current sensing means 12 may be a current transformer and voltage sensing means 14 may be a step down potential transformer. As shown in FIG. 1, a current sensing means is associated with each phase; means 12a being associated with phase A, 12b being associated with phase B and 12c being associated with phase C. Likewise, there is a separate voltage sensing means 14a associated with phase A, means 14b associated with phase B and means 14c associated with phase C. However, it is to be understood that although a specific type of current and voltage sensing scheme is depicted in FIG. 1, other schemes known in the art may be substituted for that depicted; the purpose being to obtain signals which are related to each phase voltage and each phase current as well as the sum of all three phase currents.

At this point in the detailed description, it should be noted that the preferred embodiment of the phase relay of the present invention will be hereinafter described with respect to the A-B phase pair only. This is done for purposes of clarity and convenience, since the same detailed description would also apply to B-C and C-A phase relays as well. The difference between the function and operation of a B-C or C-A phase relay and the operation of the A-B phase relay described below, is that the B-C and C-A phase relays each utilize input signals from the transmission line which relate to its particular phase pair relationship. Consequently, utilizing the following description which sets forth the A-B phase relay embodiment, one skilled in the protective relaying art could construct a B-C and/or C-A phase relay in accordance with the present invention.

The output signals from the current sensing means 12 are coupled to transactors in order to obtain a signal representative of the selected phase to phase current times a preselected constant impedance. For the A-B phase relay described herein, the output signals from current sensing means 12a and 12b, representing the $I_A$ and $I_B$ phase currents respectively, are coupled to the input of a first transactor 22. As is known in the art, the secondary voltage output of a transactor is related to the input current by a complex proportionality constant or vector operator known as the transfer impedance Z of the transactor. For the first transactor 22 shown in FIG. 1, the transfer impedance is selected to be equal to replica impedance $Z_R$. As also known in the art, the replica impedance $Z_R$ determines the reach of a distance relay. Consequently, the output of the first transactor 22 is equal to the phase current $I_{AB}$ which has been derived from the input signals representative of the phase currents $I_A$ $_{and}$ $_{-IB}$ times $Z_R$, or $I_{AB}$ $Z_R$. Further detailed discussion of transactors may be had by reference to U.S. Pat. No. 3,374,399 issued to Dewey, which patent is assigned to the assignee of the present invention and the teachings of which are incorporated by reference in this detailed description as if fully set forth herein.

Figure 6:
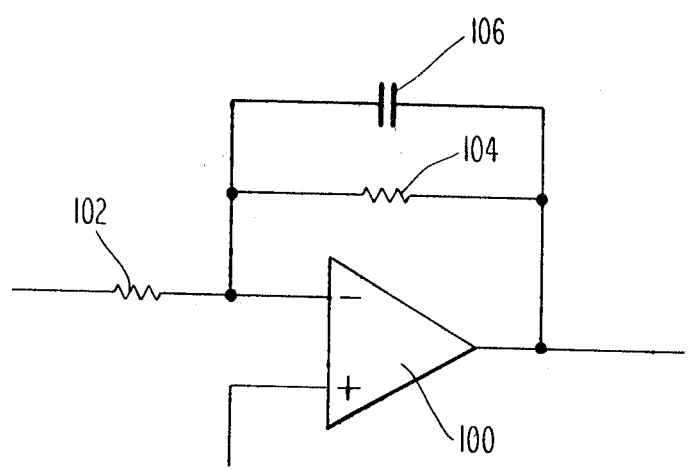
FIG. 6 is a schematic block diagram of a preferred embodiment of a signal conditioning network portion of FIG. 1.

The output $I_{AB}$ $Z_R$ of the first transactor 22, is coupled to the input of a signal conditioning network 20. The signal conditioning network 20 comprises a low pass filter designed to attenuate high frequency transients which may be generated as a result of a fault on the transmission line. In the preferred embodiment, the signal conditioning network 20 attenuates those transients having a frequency higher than rated frequency and produces a phase delay of 25° at rated frequency. The output of the signal conditioning network 20 is therefore the signal representative of $I_{AB}$ $Z_R$ with the high frequency transients attenuated and with a 25° lagging phase shift. As shown in FIG. 6, the signal conditioning network 20 comprises an operational amplifier 100 having a positive and a negative input and an output. A first resistor 102 is connected to the negative input of the amplifier 100. The positive input is connected to a reference voltage level. A feedback branch, comprising a second resistor 104 and a capacitor 106 connected in parallel, is connected between the output and the negative input of the amplifier 100. The resistors and capacitors are selected in order that the time constant of the R-C feedback branch causes a twenty-five degree delay in the output signal from the amplifier 100 with respect to the input signal. The twenty-five degree delay is selected in order to allow more opportunity for the relay to operate within the first half-cycle for faults which occur near the voltage maximum. In addition to the delay, the signal conditioning network 20 as shown in detail in FIG. 6 provides attenuation of frequencies higher than the system frequency which, in the usual power distribution system is fifty or sixty hertz.

The signal present on the commonly connected terminals of the current sensing means 12a, 12b and 12c, is representative of the net current flowing in all three phases, $3I_O$, and is coupled to the input of a second transactor 24. The transfer impedance of the second transactor 24 is also selected to be equal to the replica impedance $Z_R$; consequently, the output of the second transactor 24 is a signal representative of the net current $3I_O$ times the replica impedance $Z_R$ or $3I_O Z_R$. This signal, $3I_O Z_R$, is coupled to the input of a second signal conditioning network 25. The second signal conditioning network 25 comprises a circuit as depicted in FIG. 6 and described above. Consequently, the output of the second signal conditioning network 25 is the input signal $3I_O Z_R$ with the high frequency transients attenuated and a 25° lagging phase shift.

As shown in FIG. 1, a signal representative of the A-B phase to phase voltage $V_{AB}$, is derived from the output of a transformer 16, the input of which is coupled to voltage sensing means 14a and 14b. The output of voltage sensing means 14a ($V_{AG}$) and 14b ($V_{BG}$) are representative of the phase A to ground and phase B to ground voltages respectively. The signal representative of the phase to phase voltage $V_{AB}$ is coupled to the input of a third signal conditioning network 18. The third signal conditioning network 18 comprises a circuit as depicted in FIG. 6 and described above. Consequently, the output of the third signal conditioning network 18 is the input signal $V_{AB}$ with the high frequency transients attenuated and with a 25° lagging phase shift. It should be noted that in the preferred embodiment of the present invention the first, second and third signal conditioning networks are preferably of the same design, having the same low pass and phase delay characteristics, for both transient and steady state conditions.

The output $V_{AB}$ of the third signal conditioning network 18 is coupled to an input of a positive sequence network 26. It is well understood by those skilled in the art of electric power transmission and distribution that phase voltages and currents in a three phase alternating current circuit can be resolved into three sets of symmetrical, balanced voltage or current vector known respectively as positive sequence, negative sequence and zero sequence components. It is also well known that certain circuits called "symmetrical component networks" can be connected to a three phase electric power system to provide an output signal that is proportional to the magnitude of a selected one of the three sequence components of voltage or current. The positive sequence network 26 is one such network, having as inputs, signals representative of the three phase to phase voltages $V_{AB}$, $V_{BC}$ and $V_{CA}$. In the embodiment described herein, the output of the positive sequence network 26 is selected to be proportional to the positive sequence component of the A-B phase to phase voltage and is designated $V_{AB1}$. One such sequence network is disclosed in U.S. Pat. No. 4,342,062, which issued on a continuation of now-abandoned application Ser. No. 41,137 of M. E. Hodges, filed May 21, 1979. Further detailed descriptions of symmetrical component networks may be had by reference to U.S. Pat. Nos. 3,992,651, issued Hodges and 4,034,269 issued to Wilkinson, both of which patents as well as U.S. Pat. No. 4,342,062 are assigned to the assignee herein and the teachings of all of which are incorporated into this detailed description by reference as if fully set forth herein.

The output $V_{AB}$ of the third signal conditioning network 18 is also coupled to the input of an inverter 28. The output of inverter 28 is representative of $-V_{AB}$ or in other words, the $V_{AB}$ signal phase shifted by 180°. The signals developed in FIG. 1 are used as source signals by an A-B phase relay in accordance with the present invention, again keeping in mind that the phase relay of the present invention would likely be utilized to protect all three phases in a three phase electrical power transmission system and therefore would utilize source signals relating to the B-C and C-A phase pairs as well as the A-B phase pair.

Figure 2:
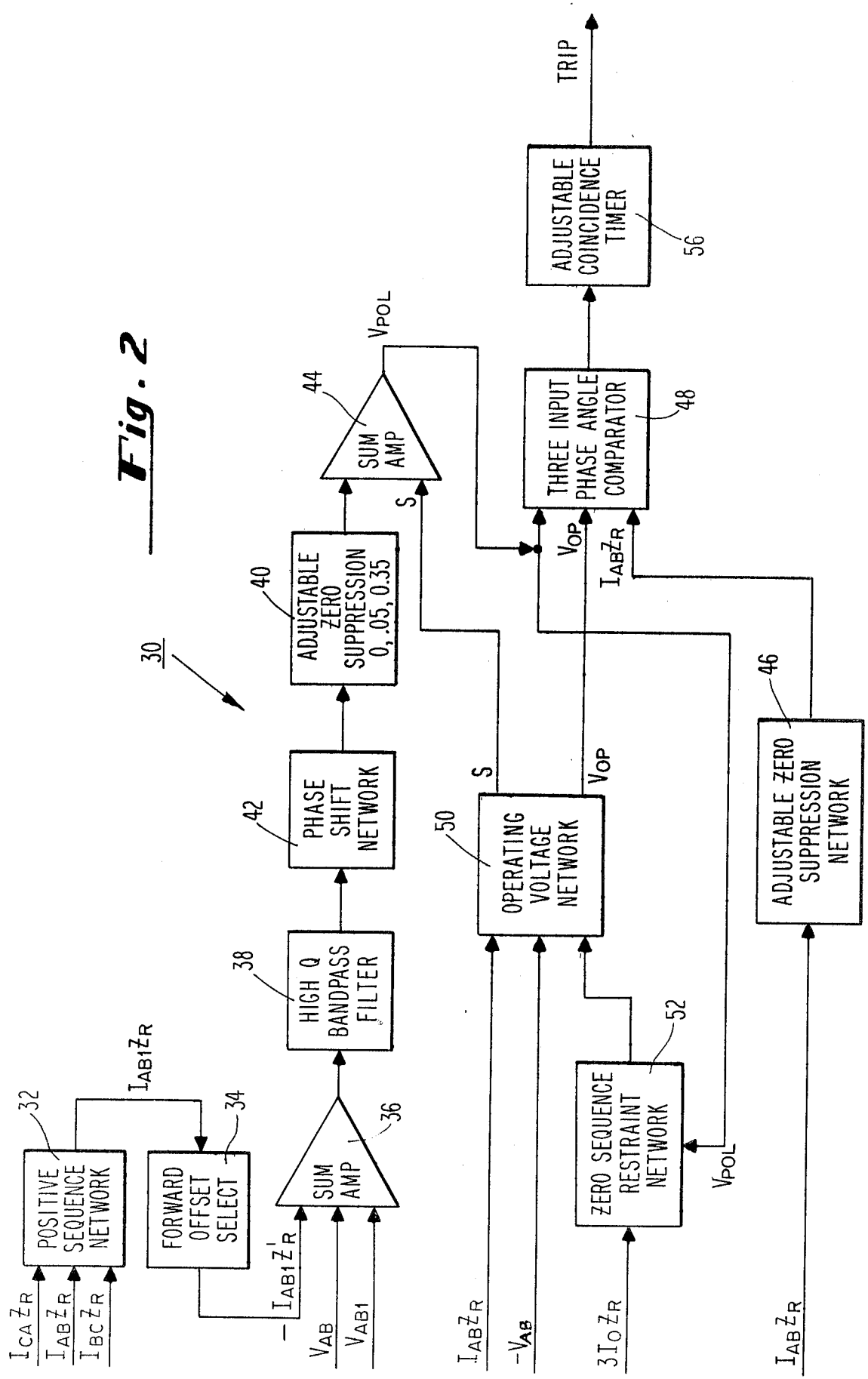
FIG. 2 is a functional diagram of a phase relay in accordance with the present invention.

In FIG. 2 there is shown a functional block diagram of the preferred embodiment of the phase relay of the present invention, which is generally designated 30. The phase relay 30 includes a positive sequence network 32 which receives as inputs, sources signals $I_{AB} Z_R$, $I_{BC} Z_R$ and $I_{CA} Z_R$. As previously stated, the output of such a network is a signal which is proportional to the magnitude of the positive sequence component of an input phase current or voltage, which as shown in FIG. 2, is the A-B phase current. Consequently, the output of the positive sequence network 32 is the positive sequence component of the A-B phase current $I_{AB1}$ times the replica impedance $Z_R$, or $I_{AB1} Z_R$. This signal is input to a forward offset voltage select network 34, which inverts and scales down the magnitude of the input signal $I_{AB1} Z_R$. Consequently, the forward offset select network 34 is preferably an inverting amplifier having adjustable gain. The output $-I_{AB1} Z'_R$ of the forward offset select network 34 is coupled to one input of a three input summing amplifier 36. The source signal $V_{AB}$ is connected to a second input of the three input summing amplifier 36 and the source signal $V_{AB1}$ is connected to the third input of the summing amplifier 36. The output of the summing amplifier 36 is $-I_{AB1} Z'_R + KV_{AB} + (1-K)V_{AB1}$ where K is a proportionality constant which can have a value in the range of zero to one but which preferably has a value of zero where the relay is used in a series compensated line and a value of 0.7 where the relay is used in an uncompensated line. The output of the summing amplifier 36 is coupled to the input of a high Q band pass filter network 38. The output of the high Q band pass filter 38 is phase shifted 180° from the input and has all unwanted high and low frequency signals substantially attenuated. The high Q band pass filter 38 has a Q of approximately 5 and tuned to provide a natural frequency equal to the power system frequency, which as previously stated is preferably fifty or sixty hertz.

The output of the high Q band pass filter 38 is coupled to the input of a phase shift network 42. The output of the phase shift network 42, which is coupled to the input of a first adjustable zero suppression network 40, is phase shifted with respect to the input by a predetermined amount for reasons which will subsequently be set forth in this detailed description. In the preferred embodiment, the phase shift network 42 comprises an all pass filter having a constant gain and adjustable phase shift. Generally, the phase shift network 42 is adjusted to impart 0° phase shift. However, under special system conditions, for example where the prefault polarizing voltage has a substantial angular difference from the source voltage, the phase shift network can be used to provide faster and more reliable operation by shifting the phase of the polarizing signal to be more closely in phase with the operate signal during a fault condition. In the preferred embodiment, the phase shift is adjustable to +30°.

The output of the first adjustable zero suppression network consists of that portion of the input signal which exceeds a preselected level. In the preferred embodiment, the preselected levels are 0, 0.05 and 0.35; therefore, depending upon which level is selected, the output signal would be that portion of the input signal $(-I_{AB1}\, Z'_R + KV_{AB} + (1-K)V_{AB1})$ which exceeds either the 0 level, the 5% level or the 35% level. The output of the first adjustable zero suppression network 40 is coupled to one input of a two input summing amplifier 44.

The source signal $I_{AB}\, Z_R$ is coupled to the input of a second adjustable zero suppression network 46. The output of the second adjustable zero suppression network 46, which comprises only that portion of the input signal $I_{AB}\, Z_R$ which exceeds the preselected level, is coupled to one input of a three input phase angle comparator 48. Source signal $I_{AB}\, Z_R$ is coupled to a first input of an operating voltage network 50 and source signal $-V_{AB}$ is coupled to a second input of the operating voltage network 50. The output of a zero sequence restraint network 52 is coupled to a third input of the operating voltage network 50. A severe fault output signal (S) from the operating voltage network 50 is coupled to the second input of the two input summing amplifier 44. An operating voltage output, $V_{OP}$, from the operating voltage network 50 is connected to a second input of the three input phase angle comparator 48. The output of the summing amplifier 44, which will hereinafter be referred to as the polarizing voltage $V_{POL}$, is coupled to a third input of the three input phase angle comparator 48 as well as a gating input of the zero sequence restraint network 52. The zero sequence restraint network 52 outputs a zero sequence restraint signal which is coupled to an input of the operating voltage network 50 as previously stated.

The output of the three input phase angle comparator 48 is connected to an adjustable coincidence timer 56. The adjustable coincidence timer 56 measures the duration of the phase coincidence of the three signals input to the three input phase angle comparator 48, and operates when this gated phase coincidence occurs for a predetermined minimum time which is equal to the minimum relay operate time. The output of the adjustable coincidence timer 56 is a trip signal which causes the operation of a circuit breaker associated with the phase relay. Further detailed description of AND circuitry and coincidence timer circuitry relating to protective relaying can be found in previously referenced U.S. Pat. No. 4,034,269 as well as U.S. Pat. No. 4,161,011, issued to Stanley B. Wilkinson, one of the co-inventors of the present invention; which patent has been assigned to the assignee of the present invention and the teachings of which patent are incorporated by reference into this detailed description as if fully set forth herein.

Figure 3:
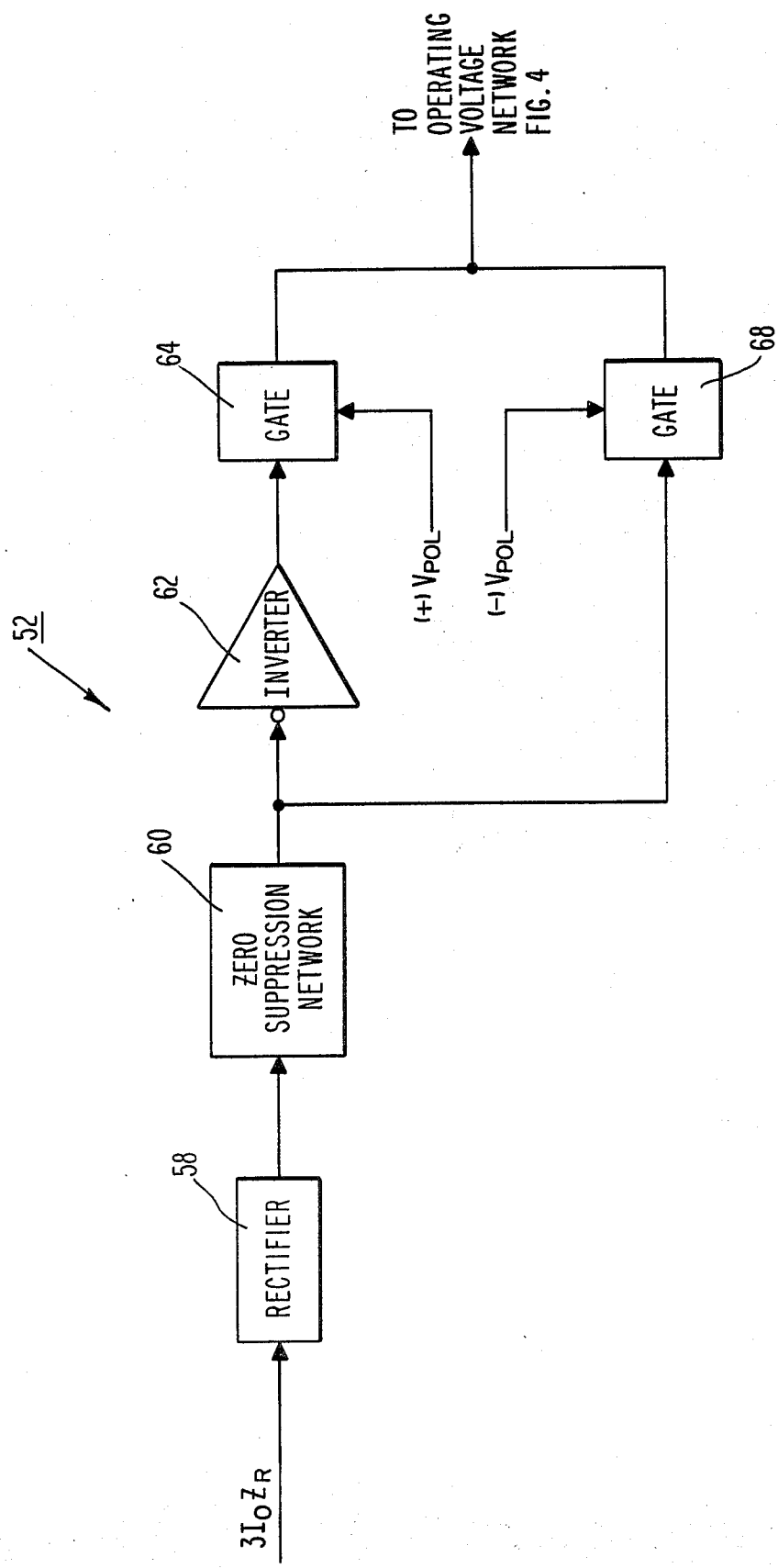
FIG. 3 is a functional block diagram of a zero sequence restraint circuit in accordance with the present invention.

Referring now to FIG. 3, there is shown a functional block diagram of the zero sequence restraint network 52. The source signal $3I_O\, Z_R$ is coupled to the input of a full wave rectifier 58. The output of the full wave rectifier 58, which comprises $3I_O\, Z_R$ fully rectified with positive polarity, is coupled to the input of a zero suppression network 60. The output of the zero suppression network 60 comprises only those portions of the input signal $3I_O\, Z_R$ which exceed a predetermined level. The output of the zero suppression network 60 is coupled to the input of an inverter 62, the output of which is the inverse of the input; or, in other words, has been phase shifted 180° with respect to the input.

The output of the inverter 62 is coupled to a signal input of a first gating circuit 64. The gate input of the first gating circuit 64 receives the positive portions of the polarizing voltage, $V_{POL}$. The output of the first gating circuit 64 comprises those portions of the input which have been gated through by the positive portions of the polarizing voltage $V_{POL}$. The output of the zero suppression network 60 is also coupled to a signal input of a second gating circuit 68. The gate input of the second gating circuit 68 receives the negative portions of the polarizing voltage $V_{POL}$; consequently, the output of the second gating circuit 68 comprises those portions of the input which are gated through by the negative portions of the polarizing voltage $V_{POL}$. The outputs of the first and second gating circuits, 64 and 68, together comprise the zero sequence restraint signal which is coupled to one input of the operating voltage network 50 as previously described.

Figure 4:
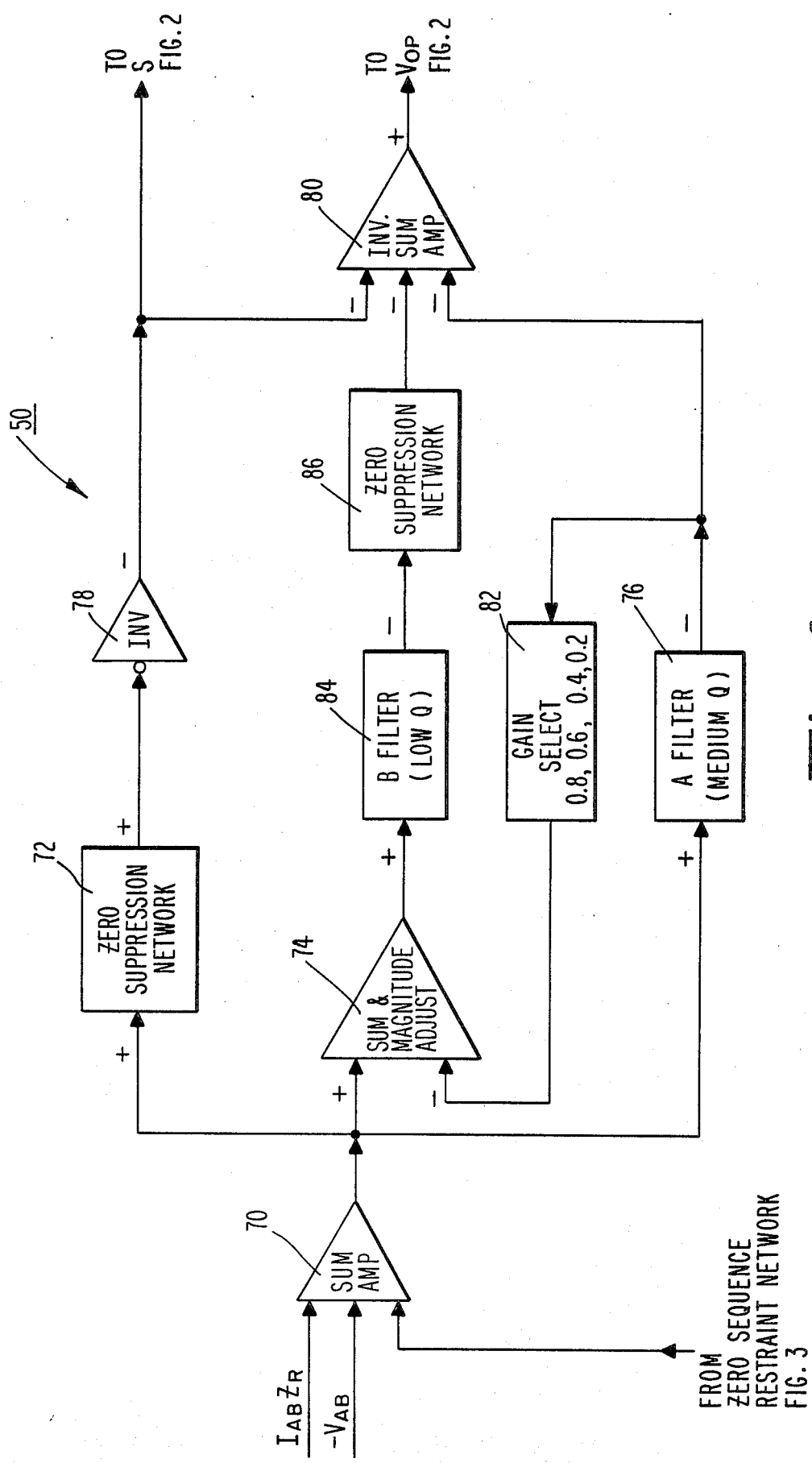
FIG. 4 is a functional block diagram of an operating voltage circuit in accordance with the present invention.

Referring now to FIG. 4, there is shown a functional block diagram of the operating voltage network 50. The operating voltage network 50 comprises a three input summing amplifier 70 which receives source signals $I_{AB}\, Z_R$ and $-V_{AB}$ as well as the zero sequence restraint signal from the zero sequence restraint network 52. The output of the summing amplifier 70 is a summation of $I_{AB}\, Z_R + (-V_{AB}) +$ the zero sequence restraint signal. This output is coupled to the input of a first zero suppression network 72, one input of a two input summation and magnitude adjust circuit 74 and the input of a medium Q filter, hereinafter referred to as the "A" filter 76. The "A" filter 76 is preferably a multiple feedback bandpass filter having a Q of two and tuned to the system frequency, which, as previously stated, is usually fifty or sixty hertz. The output of the first zero suppression network 72, which comprises only that portion of the input signal which exceeds a preselected level, is coupled to the input of an inverter 78. The output of the inverter 78 is the inverse of the input, or, in other words, the input which has been phase shifted by 180°. The output of the inverter 78 is the severe fault signal S which is coupled to the second input of the summing amplifier 44 as previously described. The severe fault signal S is also coupled to one input of the three input inverting summing amplifier 80.

The output of the A filter 76, is coupled to a second input of the three input inverting summing amplifier 80 as well as to the input of a gain select network 82. The gain select 82 adjusts the gain of the input signal to preselected values, which in the preferred embodiment are 80%, 60%, 40%, or 20% of the input signal. The gain select network 82 preferably comprises resistors which are selectable in order to provide a correct ratio of inputs to the summing amplifier 74 in order to effect the preselected gain value. The output of the gain select network 82 is coupled to the second input of the two input summing and magnitude adjust amplifier 74. The output of the summing and magnitude adjust amplifier 74 is connected to the input of a low Q filter, hereinafter referred to as the "B" filter 84. The "B" filter is preferably a multiple feedback band pass filter having a Q of one and tuned to the system frequency which, as previously stated, is usually fifty or sixty hertz. The output of the B filter 84 is coupled to the input of a second zero suppression network 86. The output of the second zero suppression network 86 comprises only those portions of the input which exceed a predetermined level and is coupled to the third input of the three input inverting and summing amplifier 80. The output of the inverting and summing amplifier 80 is the operating voltage $V_{OP}$ which is coupled to one input of the three input phase angle comparator 48, as previously described.

In the following description of the operation of the phase relay of the present invention, reference will be made to both the "dynamic" and "steady state" characteristics of protective relays. As is known in the art, the dynamic characteristic is the characteristic which exists immediately after inception of the fault. Following fault inception, the dynamic characteristic begins to move toward the post fault steady state characteristic. Further discussion of the dynamic and steady state characteristics can be found in the paper entitled "Dynamic Characteristics of MHO Distance Relays", by S. B. Wilkinson and C. A. Mathews, Power Systems Management Business Department, General Electric Company, Philadelphia, Penn., presented to Pennsylvania Electric Association Relay Committee, Winter Meeting, Philadelphia, Penn., Feb. 22, 1979, the contents of which are incorporated by reference in this detailed description as if fully set forth herein.

As described in the aforementioned paper, if load flow is presented before the fault, the dynamic characteristic of the relay will shift, causing the angle between the operating signal, $V_{OP}$, and the polarizing signal, $V_{POL}$ which is required for generation of a relay trip output, to be smaller on one side of the $Z_R$ impedance phaser and larger on the other side. The purpose of the forward offset signal is to shift the phase of the polarizing signal $V_{POL}$ to reduce the phase coincidence between the polarizing voltage and the operating voltage $V_{OP}$ caused by the flow of load current.

Figure 5:
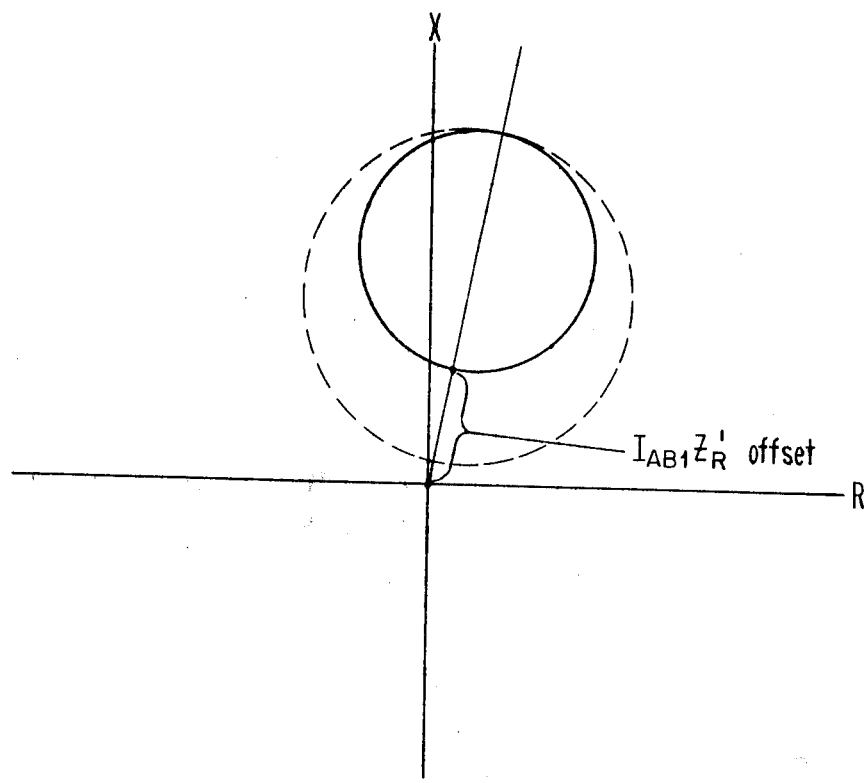
FIG. 5 depicts the effect of the use of a positive sequence component of phase to phase current on forward offset of a phase relay characteristic.

In prior art relays, this offset signal was generated using a phase current appropriately scaled to cause desired phase matching between $V_{OP}$ and $V_{POL}$. For example, referring to U.S. Pat. No. 4,296,451, issued to S. B. Wilkinson, one of the co-inventors of the present invention, on Dec. 31, 1979 and assigned to the assignee of the present invention, and specifically to FIG. 3 thereof, it can be seen that the offset signal is $-IZ'_R$ and is employed to miminize the angular overlap of the operate and polarizing signals. Use of the positive sequence component of the current, for example the phase current in the embodiment described herein, will cause the relay characteristic to expand following a phase to phase fault since the positive sequence component of the phase current $I_{AB1}$, and hence the offset signal $I_{AB1} Z'_R$, shrinks to approximately one-half of its value for a three phase fault. Further, the positive sequence component $(1-K)V_{AB1}$ of the polarizing signal does not go to zero at the fault, as described later, thus the smaller $I_{AB1} Z'_R$ is subtracting from a larger voltage signal due to the addition of the $(1-K)V_{AB1}$ component to the polarizing signal. This relationship is depicted in FIG. 5, where the prefault characteristic, associated with the load current flowing in the transmission line, is depicted by a solid line and the enlarged steady state phase to phase fault characteristic, due to the use of the positive sequence component $I_{AB1}$, is depicted as a dotted line.

The shifting of the phase of the polarizing signal $V_{POL}$ is due to the addition of the foward offset signal $(-I_{AB1} Z'_R)$ to the phase voltage $KV_{AB}$ and $(1-K)V_{AB1}$. The resultant of this summation, as is well known in the AC power transmission art, is a periodic wave form whose phase has been shifted with respect to both of the constituent wave forms. As previously stated, the use of a forward offset signal in generating a polarizing signal is described in U.S. Pat. No. 4,296,451, which patent is incorporated by reference in this detailed description as if fully set forth herein.

As shown in FIG. 2, the positive sequence component of the A-B phase voltage $V_{AB1}$ is also utilized to generate the polarizing signal $V_{POL}$. The use of this positive sequence component enhances the operation of the relay because as is well known in the art, the post fault positive sequence component of the phase to phase voltage at the fault location will be a signal having the phase angle of, and a magnitude equal to 50% of, that prefault phase to phase voltage. Consequently, although the associated phase to phase voltage could be zero following a phase to phase fault, its positive sequence component will be at least 50% of the prefault magnitude. Therefore, the use of the positive sequence component of the phase voltage as a part of the polarizing quantity insures that the polarizing quantity will still exist during the period following fault inception, for all but three phase faults.

As shown in the previously referenced U.S. Pat. No. 4,296,451, the coincidence of the polarizing signal $V_{POL}$ and the operating signal $V_{OP}$ is measured by a three input phase angle comparator, or three input AND gate as shown in FIG. 3 of the aforementioned patent. A coincidence or characteristic timer will output a relay trigger signal when this coincidence exceeds a preselected period of time. On a close-in severe fault, the severe fault signal S, which is output from the operating voltage network 50, increases the coincidence of the polarizing $V_{POL}$ and operating $V_{OP}$ signals thereby providing a faster output trip signal from the relay.

As previously described in reference to FIG. 4, the output of the summing amplifier 70 is $I_{AB}Z_R - V_{AB} +$ the zero sequence restraint signal. The level set of the zero suppression network 72 is adjusted such that it exceeds the maximum value of the magnitude of the signal output from the summing amplifier 70 related to load conditions or external fault conditions. For large, close-in, phase to phase faults, the magnitude of the $I_{AB}Z_R$ signal may greatly exceed the quantity of that which is related to load or external fault conditions. Consequently, the output of the summing amplifier 70 will exceed the level set for the zero suppression network 72 which will consequently produce an output comprising those portions of the input which exceed the level set. It is therefore seen that there will be an output from the zero suppression network 72 only for close-in severe faults. The output is inverted by inverter 78 thereby causing this signal to be in phase with the $V_{POL}$ coincidence signal. This relationship is sometimes referred to as being in the tripping direction, if one considers the tripping direction to be the in phase $V_{OP}/V_{POL}$ coincidence which causes the generation of the relay output tripping signal.

As a result, when this severe fault signal S is added to the $V_{POL}$ signal in the summing amplifier 44, it will increase the duration of coincidence of $V_{POL}$ with $V_{OP}$ immediately following the occurrence of the fault particularly if $V_{POL}$ was shifted in phase with respect to the operate signal due to heavy load transfer before the fault since it is actually adding to the $V_{POL}$ signal. This increased coincidence will exceed the minimum coincidence required by the timer 56 to more rapidly output a trip signal. Consequently, it can be seen that because of the generation of the severe fault signal S, the phase relay of the present invention is much more likely to trip on a severe close-in fault during the first half cycle when the fault occurs. This is advantageous since, as previously stated, due to the potentially catastrophic effects of severe faults, it is highly desirable that the protective phase relay generate a trip signal as soon as possible following the fault occurrence.

Referring now to FIG. 3, the input to the rectifier 58 is a signal representative of the sum of the three individual phase currents $I_A$, $I_B$ and $I_C$, (i.e. $3I_O$) multiplied by the replica impedance $Z_R$. Now assuming that an A phase to ground fault occurs, the signal $3I_O Z_R$ is going to be approximately equal to $I_A Z_R$ since $I_B$ and $I_C$ are small during this type of fault condition. This signal is then rectified by the full wave rectifier 58 and input to the zero suppression network 60. The level set of the zero suppression network 60 is adjusted such that it is just less than the magnitude of the $I_{AB} Z_R$ signal which would cause the phase relay to operate on a single line to ground fault.

Upon the occurrence of a single phase to ground fault, the magnitude of the faulted phase current, in this example $I_A$, may greatly exceed the magnitude to cause operation of the phase relay. Consequently, upon detection of a severe single phase to ground fault, the magnitude of the input signal to the zero suppression network 60 will exceed the level set therefore causing an output from the network 60. This output comprises those portions of the input signal which exceed the level set.

This output is gated with the negative portions of the polarizing voltage $V_{POL}$ by the second gating circuit 68. The output of the zero suppression network 60 is also inverted by the inverter 62 and gated with the positive portions of the polarizing voltage $V_{POL}$ by the first gating circuit 64. Consequently, the outputs of the first and second gating circuits, 64 and 68, together comprise a signal which is synchronized with, and 180° out of phase with the polarizing voltage $V_{POL}$. Thus, the combined outputs of the first and second gating circuits 64 and 68 will always appear as a restraint signal regardless of its phase angle relationship with $V_{POL}$.

Referring now to FIG. 4, it is shown that the zero sequence restraint signal is summed with the $-V_{AB}$ signal and the $I_{AB} Z_R$ signal in summing amplifier 70. As stated in previously referenced U.S. Pat. No. 4,296,451, the $-V_{AB}$ signal is a restraint signal which prevents the operating signal $V_{OP}$ from exceeding that coincidence angle with respect to the polarizing signal $V_{POL}$ during load or external fault conditions. However, on a severe single line to ground fault in front of the relay (where the source impedance is small and the relay reach is long) the $-V_{AB}$ signal is insufficient to prevent operation of the phase relay. Consequently, the addition to the $-V_{AB}$ signal of the zero sequence restraint signal in this example, would provide sufficient additional restraint to prevent the tripping output of the relay. As previously described, this zero sequence restraint signal addition would only appear upon the detection of a fault involving ground. Consequently, the relay will not generate a tripping signal upon detection of a single phase to ground fault. This is advantageous since, as previously stated, the phase relay will cause the tripping of all three phases upon detection of a fault; therefore, the fault must be an interphase fault rather than a single phase to ground fault which would require the tripping of only the faulted phase.

For double line to ground faults, it is desired that the phase relay operate to initiate three pole tripping in single pole tripping and reclosing schemes. However, the restraint voltage ($-V_{AB}$) will be less and the $I_{AB} Z_R$ quantity will be much larger for a double line to ground fault compared to a single line to ground fault. Thus operation is not blocked for double line to ground faults with typical ratios of source to line impedance and zero sequence to positive sequence source impedance. If these ratios are unusually small, then operation of the phase relay may be blocked, and reliance is placed on the ground relays to provide appropriate tripping for the double line to ground fault.

As shown in FIG. 4, the operating signal, $V_{OP}$, is the sum of the three input signals to the inverting summing amplifier 80. One of these input signals is the previously described severe fault signal S. A second input signal is the output from the A filter 76. Third input signal is the output of the summing and magnitude adjust amplifier 74, which has been processed by the B filter 84 and the second zero suppression network 86. The output of the summing and magnitude adjust amplifier 74 is proportional to the output of the summing amplifier 70 minus a selected portion of A filter 76 output.

Under steady state, non-trip conditions, there is no severe fault signal S output. Also under these conditions, the output of the A filter 76 is the equivalent of the prior art $V_{OP}$ signal described and shown (see FIG. 2) in the previously referenced U.S. Pat. No. 4,296,451. In the present invention, under steady state, non-trip conditions, the output of the A filter 76 functions as a restraint signal relative to the polarizing signal $V_{POL}$, at the input to the inverting summing amplifier 80.

As previously stated, a selected portion of the A filter 76 output is added to the summing amplifier 70 output by the summing and magnitude adjust amplifier 74. As shown in FIG. 4, the selected portion of the A filter 76 output is determined by the gain select network 82 and can be 80%, 60%, 40% or 20% in the embodiment shown. It should be noted that the A filter 76 output is 180° out of phase with respect to the summing amplifier 70 output due to the inversion imparted by the A filter 76. Consequently, the input to the B filter 84 is a difference signal equal to the difference between the output of the summing amplifier 70 and the selected portion of the A filter 76 output. The use of this difference signal instead of the restraint signal alone, as described in U.S. Pat. No. 4,296,451, enables the energy stored in the B filter to be reduced thereby enabling a faster filter response.

The output of the summing amplifier 70, under steady state, non-trip conditions, functions as a restraint signal. Since, as previously decribed, the selected portion of the A filter 76 output is 180° out of phase with respect to the summing amplifier 70 output, the selected portion functions as an operate signal under these conditions. Consequently, that portion of the B filter 83 output which exceeds the level set of the zero suppression network 86 is a net restraint signal which is added to the A filter 76 output, which is also functioning as a restraint signal as previously described.

Immediately following the occurrence of an internal fault, the output from the summing amplifier 70 becomes an operate signal as previously described in the aforementioned reference U.S. Pat. No. 4,296,451. The output of the summing amplifier 70 is now in phase with the output of the A filter 76 which initially maintains its prefault phase due to the output "memory" imparted by its medium Q characteristic. As is well known in the art, the output "memory" of a filter is a function of its Q;

that is, the higher the Q, the greater the output time constant.

Eventually, the output of the A filter 76 will change from a restraint signal at the input to the inverting summing amplifier 80 to an operate signal following the occurrence of an internal fault. As previously stated, the time it takes to make this change is a function of the Q of the filter. It is therefore desirable that the Q of the A filter 76 not be so large as to cause its restraint contribution to remain in effect for too long a time period. This would delay the operation of the relay upon detection of an internal fault having a level which would cause an output from the zero suppression network 86 but which output would not exceed the restraint contribution of the A filter 76.

The low Q characteristics of the B filter enables a fast output response which enhances the speed of operation of the relay. This speed is further enhanced due to the fact that the input to the B filter is a difference signal which further increases the filter response speed as previously described.

While the present invention has been described with reference to a specific embodiment thereof, it will be obvious to those skilled in the art that various changes and modifications may be made without departing from the invention in its broader aspects. It is contemplated in the appended claims to cover all variations and modifications of the invention that come within the true spirit and scope of our invention.

What is claimed as new and desired to be secured by Letters Patent of the United States is:

1. In a protective relay for detecting faults in a three-phase AC power system, the relay being of a phase angle comparator type and including phase coincidence detecting means responsive to at least two input signals supplied thereto, one input signal being an operating signal and a second input signal being a polarizing signal, and timer circuit means responsive to an output signal from said phase coincidence detecting means when the phase coincidence of the input signals is of a predetermined duration, means for developing said operating signal upon detection of a fault by summing the following signals:
   a. a pre-fault signal comprising the pre-fault value of a first difference signal which is related to the difference between (1) the product of a signal proportional to a transmission line current and a replica impedance of the transmission line and (2) a signal proportional to a transmission line voltage; and
   b. that portion of a second difference signal which exceeds a predetermined threshold value, the second difference signal being related to the difference between (1) said first difference signal and (2) a preselected portion of the magnitude of said pre-fault signal.

2. A protective relay in accordance with claim 1 wherein said operating signal further comprises the addition of that portion of said first difference signal which exceeds a predetermined threshold value.

3. A protective relay in accordance with claim 2 wherein said polarizing signal is dependent upon the sum of:
   a. a signal proportional to a transmission line voltage;
   b. a signal proportional to a positive sequence component of said transmission line voltage; and
   c. a forward offset signal comprising the inverted product of a signal proportional to a positive sequence component of a transmission line current and a preselected portion of the magnitude of said transmission line replica impedance.

4. A protective relay in accordance with claim 3 wherein said first different signal further comprises the addition of that portion of the product of a signal proportional to a zero sequence component of the transmission line current and the replica impedance of the transmission line which exceeds a predetermined threshold value and which is coincident with said polarizing signal.

5. A protective relay in accordance with claim 1 wherein said transmission line voltage is a phase to phase voltage and said transmission line current is the corresponding phase to phase current.

6. A protective relay in accordance with claim 1 wherein said phase coincidence detecting means is responsive to three input signals thereto, the third signal being related to that portion of the product of the signal proportional to a transmission line current and the replica impedance of the transmission line which exceeds a predetermined threshold value.

7. A protective relay for generating, upon detection of a fault, a signal for controlling the trip coil of a circuit breaker protecting an AC power transmission system, said relay having an operating circuit comprising:
   a. first summing circuit means for producing a first difference signal proportional to the difference between (1) a signal proportional to a transmission system current multiplied by a preselected constant reference impedance and (2) a signal proportional to a transmission system voltage;
   b. first filter circuit means responsive to said first difference signal for filtering transients from said first difference signal and for providing memory of the prior steady state filtered first difference signal following fault inception, said first filter circuit means having a preselected Q;
   c. gain select circuit means attenuating the magnitude of said first filtered signal to a preselected portion thereof;
   d. second summing circuit means for producing a second difference signal proportional to the difference between the first difference signal and said preselected portion of the magnitude of said filtered first difference signal;
   e. second filter circuit means responsive to said second difference signal for filtering transients from said second difference signal, said second filter circuit means having a Q which is less than the Q of said first filter circuit means;
   f. alternating current zero suppression circuit means responsive to said filtered second difference signal for producing an output signal when said filtered second difference signal exceeds a predetermined threshold value;
   g. third summing circuit means for producing an operating signal which is the sum of said filtered first difference signal and the output signal of said alternating current zero suppression circuit means.

8. A protective relay in accordance with claim 7 wherein said first and second filter circuit means are tuned to the AC power system frequency and the Q of the second filter circuit means is substantially equal to one-half of the Q of the first filter circuit means.

9. A protective relay in accordance with claim 8 wherein the Q of said first filter circuit means is substantially equal to two and the Q of the second filter circuit means is substantially equal to one.

10. A protective relay in accordance with claim 7 wherein said operating circuit additionally comprises:
   a. a second alternating current zero suppression circuit means responsive to said first difference signal for producing an output signal when said first difference signal exceeds a predetermined threshold value;
   b. inversion circuit means for inverting the output signal from said second alternating current zero suppression circuit means; and
   c. means for coupling the output of said inversion circuit means to said third summing circuit means whereby said operating signal additionally comprises the inverted signal output from said second alternating current zero suppression circuit means.

11. The protective relay in accordance with claim 10 having a polarizing circuit comprising:
   a. a fourth summing circuit means for producing an output signal which is proportional to at least the sum of a signal proportional to a positive sequence component of said transmission system voltage and a forward offset signal comprising the inverted product of a signal proportional to a positive sequence component of a transmission system current and a preselected portion of the magnitude of said preselected constant reference impedance;
   b. a third filter circuit means responsive to said fourth summing circuit output signal for filtering transients from said signal and for providing, following fault inception, a memory of the prior steady state fourth summing circuit output signal;
   c. a third alternating current zero suppression circuit means responsive to said filtered fourth summing circuit output signal for producing an output signal when said fourth summing circuit output signal exceeds a predetermined threshold value; and
   d. a fifth summing circuit means for producing a polarizing signal which is proportional to the sum of the output of said fourth alternating current zero suppression circuit means and the inverted output of said second alternating current zero suppression circuit means of said operating circuit.

12. The protective relay in accordance with claim 11 wherein the output signal of said fourth summing circuit means includes the addition of a signal proportional to a transmission system voltage.

13. A protective relay in accordance with claim 11 additionally comprising:
   a. rectifier circuit means for rectifying a signal proportional to the product of a zero sequence component of a transmission system current and the preselected constant reference impedance;
   b. a fourth alternating current zero suppression circuit means responsive to said rectified signal for producing an output signal when said rectified signal exceeds a predetermined threshold value;
   c. first gate circuit means for gating the output of said fourth alternating current zero suppression circuit means with a corresponding polarity portion of said polarizing signal;
   d. inversion circuit means for inverting the output of said fourth alternating current zero suppression circuit means;
   e. second gate circuit means for gating the output of said inversion circuit means with a corresponding polarity portion of said polarizing signal; and
   f. means for coupling the output of said first and second gate circuit means to an input of said first summing circuit means of said operating circuit.

14. A protective relay for generating, upon detection of a fault, a signal for controlling the trip coil of a circuit breaker for protecting one or more transmission lines in a three phase AC power system, said relay having an operating circuit comprising:
   a. first summing circuit means for producing a first difference signal proportional to the difference between (1) a signal proportional to a phase to phase current multiplied by a replica impedance of the transmission line and (2) a signal proportional to a corresponding phase to phase voltage during fault;
   b. first filter circuit means repsonsible to said first difference signal for filtering transients from said first difference signal and for providing memory of the prior steady state filtered first difference signal following fault inception, said first filter means having a preselected Q;
   c. gain select circuit means for producing an output which is proportional to a preselected portion of the magnitude of the output of said first filter circuit means;
   d. second summing circuit means for producing a second difference signal proportional to the difference between (1) the first difference signal and (2) the preselected portion of said filtered first difference signal;
   e. second filter circuit means responsive to said second difference signal for filtering transients from said second difference signal, said second filter circuit means having a Q which is less than the Q of said first filter circuit means;
   f. first alternating current zero suppression circuit means responsive to said filtered second difference signal for producing an output signal when said filtered second difference signal exceeds a predetermined threshold value; and
   g. summing and inverting circuit means for summing the output of said first filter circuit means with the output of said first alternating current zero suppression circuit means and inverting the sum to produce an operating signal.

15. A protective relay in accordance with claim 14 wherein said first and second filter circuit means are tuned to the AC power system frequency and the Q of said second filter circuit means is substantially equal to one-half of the Q of said first filter circuit means.

16. A protective relay in accordance with claim 15 wherein the Q of said first filter circuit means is substantially equal to 2 and the Q of the second filter circuit means is substantially equal to 1.

17. A protective relay in accordance with claim 14 wherein said operating circuit additionally comprises:
   a. second alternating current zero suppression circuit means responsive to said first difference signal for producing an output signal when said first difference signal exceeds a predetermined threshold value;
   b. inversion circuit means for inverting the output signal from said second alternating current zero suppression circuit means; and
   c. means for coupling the output of said inversion circuit means to said summing and inverting circuit means whereby said operating signal additionally comprises the inverted signal output from said second alternating current zero suppression circuit means.

18. The protective relay in accordance with claim 17 having a polarizing circuit which comprises:
   a. a fourth summing circuit means for producing an output signal which is proportional to at least the sum of a signal proportional to a positive sequence component of said phase to phase voltage and a forward offset signal comprising the inverted product of a signal proportional to a positive sequence component of a corresponding phase to phase current and a preselected portion of the magnitude of said preselected constant reference impedance;
   b. a third filter circuit means responsive to said fourth summing circuit output signal for filtering transients from said signal and for providing, following fault inception, a memory of the prior steady state fourth summing circuit output signal;
   c. a third alternating current zero suppression circuit means responsive to said filtered fourth summing circuit output signal for producing an output signal when said filtered fourth summing circuit output signal exceeds a predetermined threshold value; and
   d. a fifth summing circuit means for producing a polarizing signal which is proportional to the sum of the output of said fourth alternating current zero suppression circuit means and the inverted output of said second alternating current zero suppression circuit means of said operating circuit.

19. The protective relay in accordance with claim 18 wherein the output signal of said fourth summing circuit means includes the addition of a signal proportional to a phase to phase voltage.

20. A protective relay in accordance with claim 18 additionally comprising:
   a. rectifier circuit means for rectifying a signal proportional to the product of a zero sequence component of said transmission system currents and the preselected constant reference impedance;
   b. a fourth alternating current zero suppression circuit means responsive to said rectified signal for producing an output signal when said rectified signal exceeds a predetermined threshold value;
   c. first gate circuit means for gating the output of said fourth alternating current zero suppression circuit means with a corresponding polarity portion of said polarizing signal;
   d. inversion circuit means for inverting the output of said fourth alternating current zero suppression circuit means;
   e. second gate circuit means for gating the output of said inversion circuit means with a corresponding polarity portion of said polarizing signal; and
   f. means for coupling the output of said first and second gate circuit means to an input of said first summing circuit means of said operating circuit.

* * * * *